(12) United States Patent
Carr et al.

(10) Patent No.: US 6,319,118 B1
(45) Date of Patent: Nov. 20, 2001

(54) SEED PACKAGE HANDLING SYSTEM FOR TEST PLOT COMBINE

(75) Inventors: Brian W. Carr, Nevada; Donald F. Handorf, Ames; Nick Merfeld, Nevada; Ryan D. Jensen, Huxley; Scott A. Sporrer, Nevada, all of IA (US)

(73) Assignee: Gary W. Clem, Inc., Nevada, IA (US)

( * ) Notice: Subject to any disclaimer, the term of this patent is extended or adjusted under 35 U.S.C. 154(b) by 0 days.

(21) Appl. No.: 09/761,443

(22) Filed: Jan. 16, 2001

Related U.S. Application Data

(62) Division of application No. 09/407,518, filed on Sep. 28, 1999.

(51) Int. Cl.[7] ............................. A01D 17/02; A01F 12/46
(52) U.S. Cl. .......................... 460/114; 414/495; 414/501
(58) Field of Search ............................. 460/1, 5, 6, 114; 414/414, 422, 425, 471, 472, 486, 495, 501; 198/418.5

(56) References Cited

U.S. PATENT DOCUMENTS

| | | |
|---|---|---|
| 4,113,120 | 9/1978 | Pickrell . |
| 4,213,924 | 7/1980 | Shirley, Jr. . |
| 4,280,779 | 7/1981 | Warner et al. . |
| 4,286,530 | 9/1981 | Conley . |
| 4,505,631 | 3/1985 | Warner et al. . |
| 4,989,917 * | 2/1991 | Schmidt, Jr. ........................... 298/11 |
| 5,251,652 * | 10/1993 | Strausser et al. ....................... 134/84 |
| 5,435,430 * | 7/1995 | Steiner et al. .................... 198/370.05 |
| 5,484,245 | 1/1996 | Zopf . |
| 5,580,211 | 12/1996 | Mengel . |
| 5,664,402 | 9/1997 | Sandvik et al. . |
| 5,690,465 | 11/1997 | Ledwell . |
| 5,718,556 | 2/1998 | Forsyth . |
| 5,741,107 | 4/1998 | Georg . |
| 5,833,428 * | 11/1998 | Szinte ................................... 414/408 |
| 5,884,502 * | 3/1999 | Jones et al. ............................ 62/344 |
| 5,888,044 | 3/1999 | Baskerville . |
| 5,938,394 | 8/1999 | Christenson . |
| 6,154,911 | 12/2000 | Vanderlinden . |

* cited by examiner

Primary Examiner—Robert E. Pezzuto
Assistant Examiner—Árpád Fábián Kovács
(74) Attorney, Agent, or Firm—Zarley, McKee, Thomte, Voorhees & Sease

(57) ABSTRACT

A seed package handling system for a test plot combine. A seed packaging assembly in the combine packages the seeds and deposits the packages onto a conveyor, which transports the packages to a first hopper. After the first hopper has received a predetermined quantity or weight of seed, the first hopper is raised on an elevator and then tilted so as to dump the seed packages into a larger second hopper. After the second hopper has received a predetermined quantity or weight of seed, the second hopper is tilted to discharge the seed packages into a wagon separate from the combine, which transports the seed packages to a processing facility. The movement of the conveyor and first hopper is controlled by a PLC.

8 Claims, 5 Drawing Sheets

SEED PACKAGE HANDLING SYSTEM FOR TEST PLOT COMBINE

This application is a division of application Ser. No. 09/407,518 filed Sep. 28, 1999.

BACKGROUND OF THE INVENTION

In seed test plots, sample seeds are harvested by special test plot combines. The harvested seeds are placed in identified bags or packages, and then maintained for further evaluation and subsequent planting. Such a process and apparatus is disclosed in U.S. Pat. No. 5,664,402.

However, the great number and bulk of the seed packages creates a handling problem, since the packages have to be collected on the plot combine, and then delivered to a separate vehicle for transportation to a processing center. The handling problem becomes greater as the speed and efficiency of the plot combine is improved. Human fatigue is also a problem arising from the handling of thousands of seed packages, which may weigh 10 pounds or more.

Accordingly, a primary objective of the present invention is the provision of a method and means for efficiently handling the seed packages from a test plot combine used in seed test plot harvesting.

Another objective of the present invention is the provision of a method and means of handling a large volume of packaged seed samples automatically.

A further objective of the present invention is the provision of an improved seed package handling system which minimizes or eliminates human interaction in the handling process.

These and other objectives will become apparent to those skilled in the art from the following description of the invention.

SUMMARY OF THE INVENTION

A test plot combine is provided with a seed packaging assembly for bagging or packaging the harvested seeds from a test plot. The combine also includes a first hopper or bucket into which the seed packages are deposited. After a predetermined number of seed packages are loaded into the bucket, the bucket is automatically raised and dumped into a larger second hopper within the combine. After the second hopper has received a predetermined number of seed packages, the second hopper is tilted to discharge the packages into a container, such as a wagon, separate from the combine for transport to a processing facility. The loading and unloading of the first hopper is controlled by a PLC.

DETAILED DESCRIPTION OF THE DRAWINGS

Figure 1:
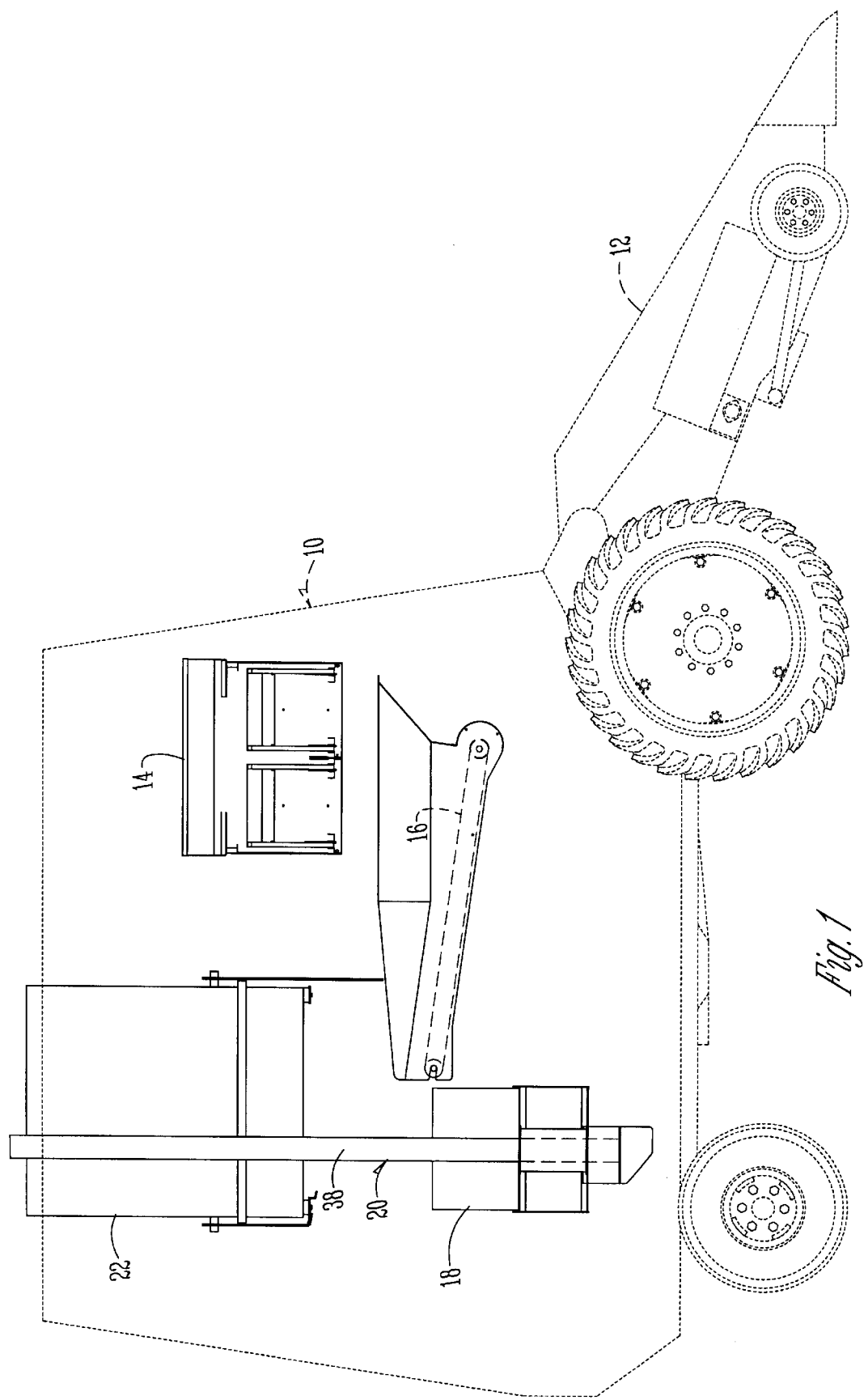
FIG. 1 is a side elevation view showing a test plot combine with the seed packaging handling system of the present invention.

A test plot combine is generally designated in the drawings by the reference numeral 10. The combine 10 includes a harvesting head 12 for harvesting seeds from the test plot rows. Contained within the combine 10 is a seed packaging assembly 14. The details of the packaging assembly 14 are described in U.S. Pat. No. 5,664,402, which is incorporated herein by reference.

The seed package handling system of the present invention is contained within the combine 10 and includes a conveyor 16, a first hopper or bucket 18, an elevator of lift assembly 20, and a second hopper or tank 22. As seen in the drawings, the volume of the second hopper 22 is substantially larger than the volume of the first hopper 18.

The handling system also includes a programmable logic control (PLC) or microprocessor 24. The PLC 24 controls a first motor 26 which actuates the conveyor 16 and a second motor 28 which actuates the elevator 20. The PLC 24 also controls the extension and retraction of a first linear actuator 30 attached to the first hopper 18, and a second hydraulic cylinder 32 attached to the second hopper 22.

Figure 2:
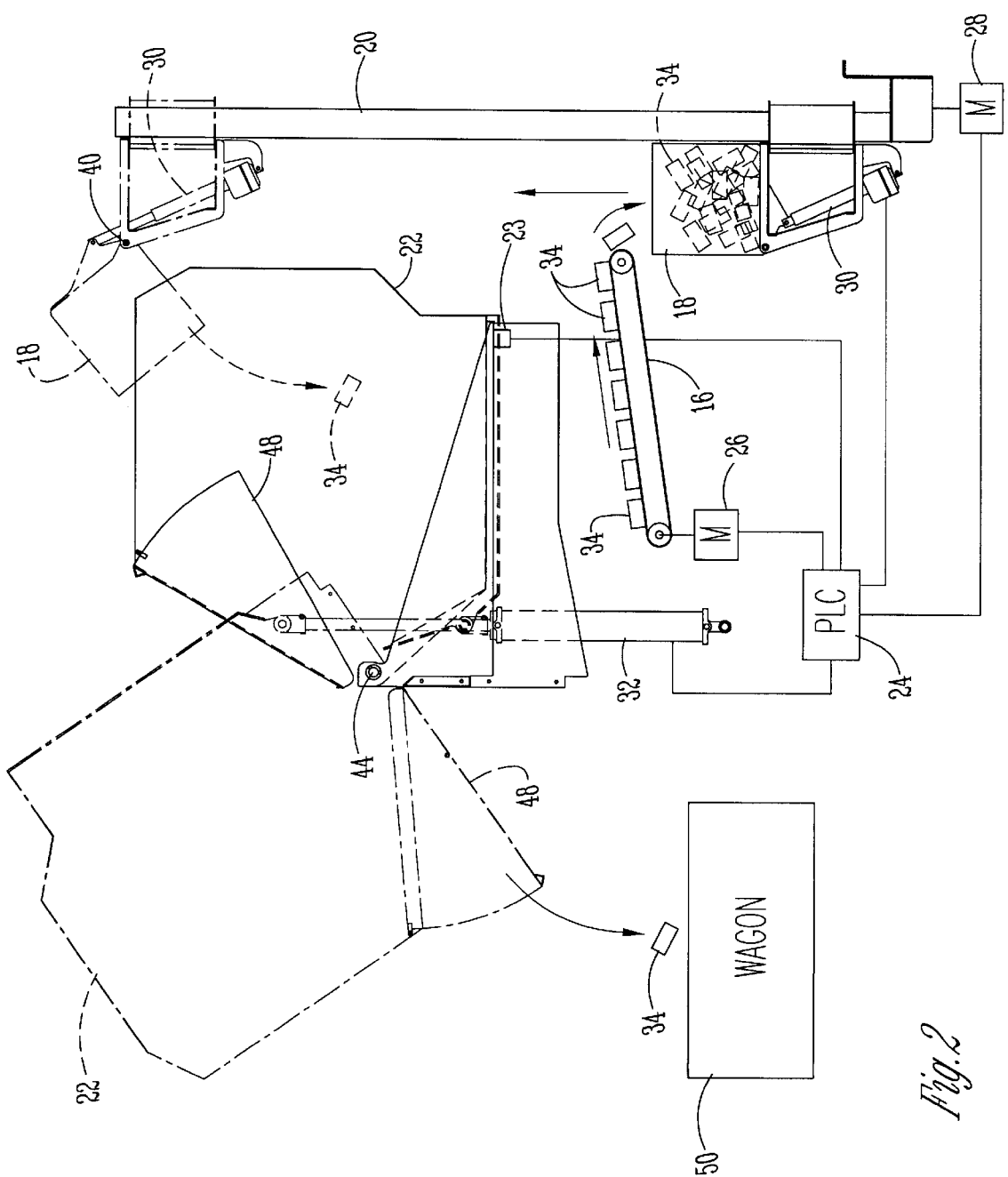
FIG. 2 is a schematic view of the seed package handling system of the present invention.

As the combine 10 is harvesting seed from the test plot, the seeds are directed to the packaging assembly 14 wherein the seeds are packaged into a plurality of bags or packages 34. As each bag is closed and sealed, the packaging assembly 14 deposits each bag on a chute 36 wherein the bags 34 fall by gravity onto the conveyor 16. The conveyor delivers the bags 34 to the first hopper 18, as best seen in FIG. 2. After a predetermined number of bags or a predetermined weight is accumulated within the first hopper, the PLC 24 deactivates the motor 26 so that the conveyor 16 is turned off.

Figure 4:
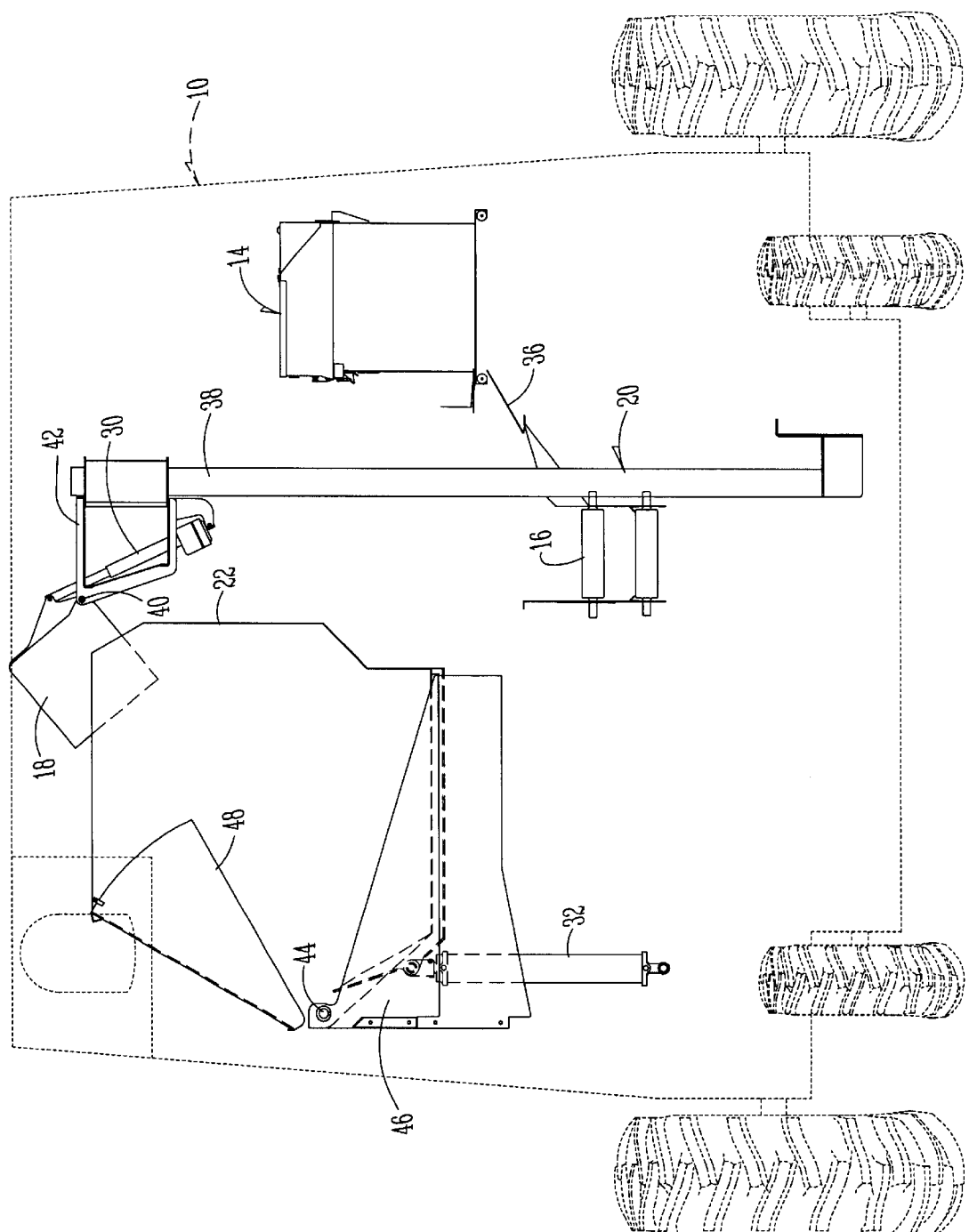
FIG. 4 is a view similar to FIG. 3 showing the bucket in a raised package dumping position.

Simultaneously, the PLC 24 activates the motor 28 which turns on the elevator 20 so as to raise the first hopper 18 along the elevator track or post 38. When the first hopper 18 reaches the top of the elevator 20, the PLC 24 activates the first linear actuator 30 which is extended so as to pivot the first hopper 18 about a pivot axis 40 on the hopper frame 42, as shown in FIGS. 2 and 4. Thus, the seed packages 34 in the first hopper 18 are dumped into the larger second hopper 22. The first hopper 18 is then lowered to its loading position, whereafter the PLC 24 reactivates the motor 26, thereby turning on the conveyor 16 to deposit additional seed bags 34 into the first hopper 18. It shall be noted that sensor 23 (FIG. 2) is located just below hopper 22 and is connected to PLC 24. Sensor 23 performs the function of notifying PLC 24 when hopper 22 is in its non-tilted position so that the PLC will not allow hopper 18 to be dumped unless the hopper 22 is in its lowered position. This prevents hopper 18 from being dumped unless hopper 22 is in position to retrieve the seed bags from hopper 18. While the conveyor 16 is turned off, the packaging assembly 14 may continue to operate and discharge bags onto the stopped conveyor 16.

Figure 3:
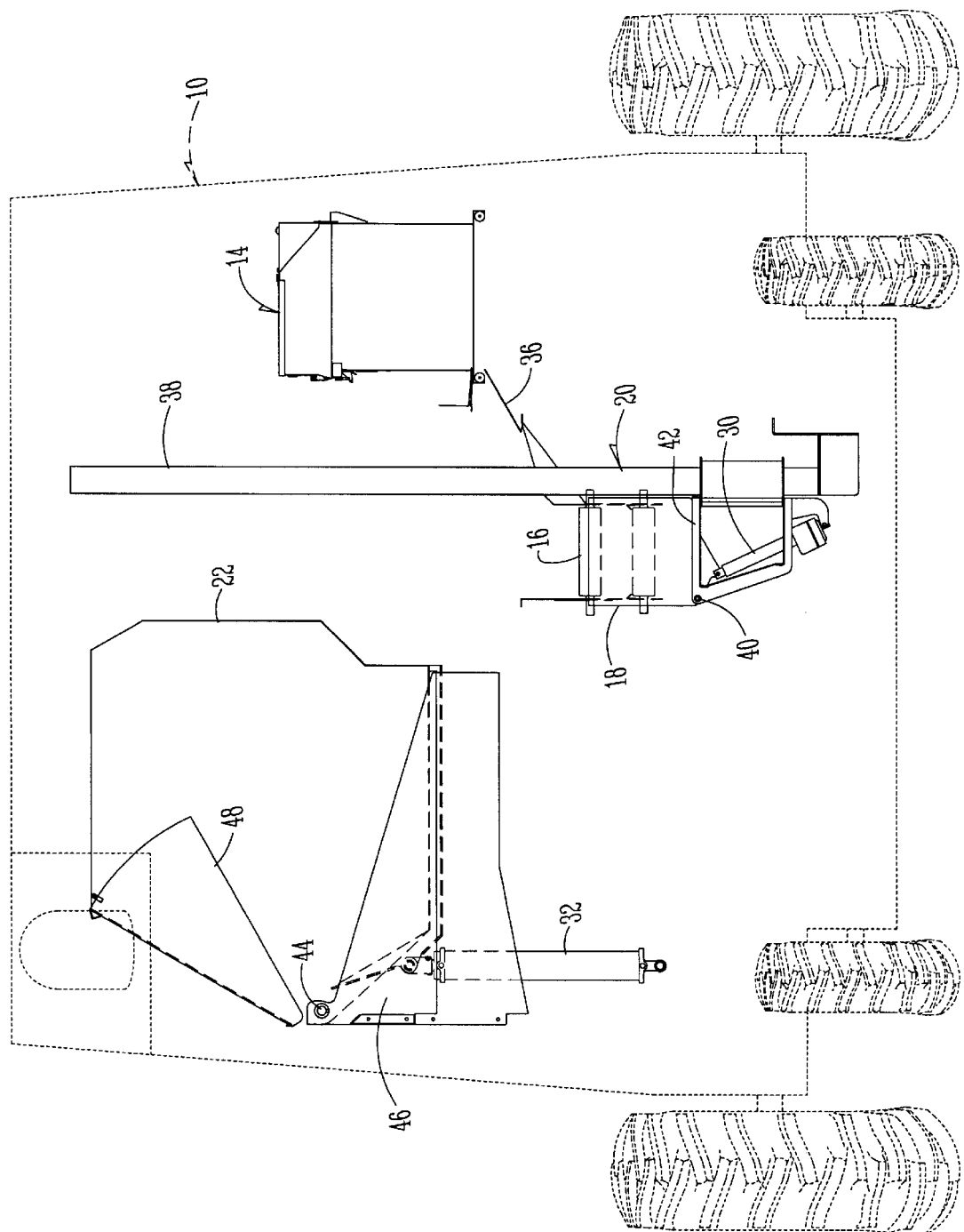
FIG. 3 is an end elevation view of the combine showing the bucket or first hopper in a loading position.
Figure 5:
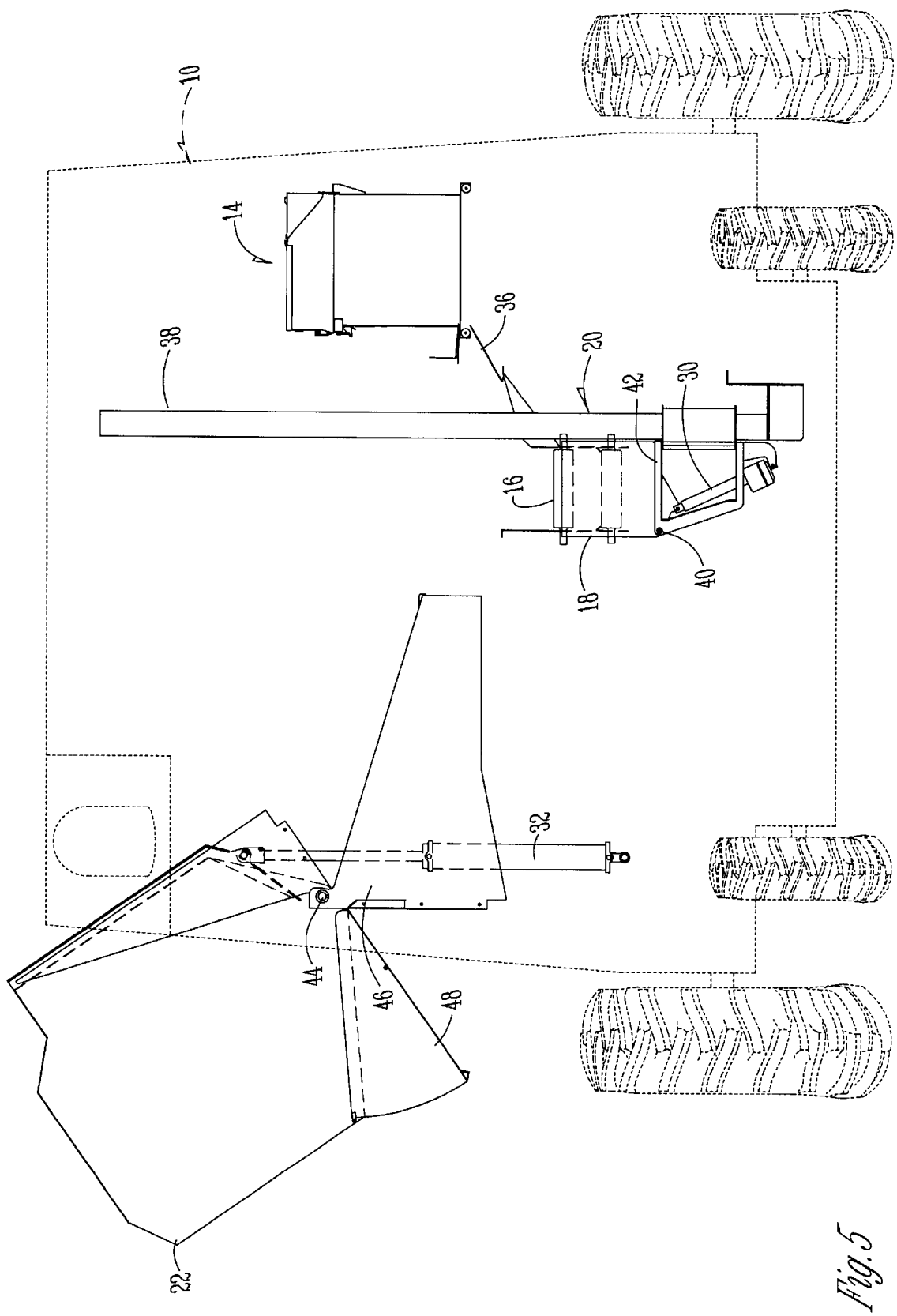
FIG. 5 is a view similar to FIG. 4 showing the second hopper in a tilted discharge position.

After a predetermined quantity of bags or weight has been loaded into the second hopper 22, the second hydraulic cylinder 32 can be actuated by the operator to pivot the second hopper 22 about a pivot axis 44 on the frame 46 of the second hopper, as seen in FIGS. 2 and 5. The second hopper 22 includes a spring-loaded door 48. The door 48 is normally closed by the spring bias, as seen in FIG. 3, and is swung to an open position, as shown in FIG. 5, by the weight of the seed bags 34 when the second hopper 22 is tilted to the discharge or unloading position. As shown in FIG. 2, when the second hopper is pivoted to the discharge position, the seed bags fall by gravity out the door 48 and into a wagon or other vehicle 50, separate from the combine, for transport to a processing facility.

It is understood that as an alternative to the PLC 24 controlling movement of the conveyor 16 and the hoppers 18, 22 based upon the predetermined quantities or weight of bags, the PLC 24 can be programmed to operate on predetermined time periods so that the hoppers 18, 22 are periodically unloaded at preset time intervals. It is also understood that appropriate signal processing devices (not shown) are provided so as to send signals to and from the PLC 24 to operate the motors 26, 28 and the hydraulic cylinders 30, 32.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A method of conveying sample seed packages from a seed test plot combine, comprising:

harvesting and packaging separate seed samples with a combine to create a plurality of seed packages;

conveying the seed packages to a first hopper;

elevating the first hopper to a discharge height;

dumping the seed packages from the first hopper into a second hopper of greater size than the first hopper;

repeating the foregoing steps until the second hopper contains a predetermined quantity of seed packages; and dumping the seed packages from the second hopper into a transport vehicle separate from the combine.

2. The method of claim 1 wherein the packaging of seed is continued while the first hopper is being elevated.

3. The method of claim 1 wherein the seed packages are automatically loaded into the first hopper, dumped into the second hopper, and dumped into the transport vehicle without manual handling of the packages.

4. The method of claim 1 further comprising automatically controlling the conveying and elevating steps controlling the dumping of the first hopper with a computer.

5. A method of conveying sample seed packages from a seed test plot combine comprising:

harvesting and packaging separate seed samples with a combine to create a plurality of seed packages;

conveying the seed packages to a first hopper;

elevating the first hopper to a discharge height when the first hopper receives a predetermined quantity of packages;

dumping the seed packages from the first hopper into a second hopper of greater size than the first hopper;

repeating the foregoing steps until the second hopper contains a predetermined quantity of seed packages; and dumping the seed packages from the second hopper into a transport vehicle separate from the combine.

6. The method of claim 5 wherein the packaging of seed is continued while the first hopper is being elevated.

7. The method of claim 5 wherein the seed packages are automatically loaded into the first hopper, dumped into the second hopper, and dumped into the transport vehicle without manual handling of the packages.

8. The method of claim 5 further comprising automatically controlling the conveying and elevating steps and controlling the dumping of the first hopper with a computer.

\* \* \* \* \*